US009398291B2

(12) United States Patent
de la Barré et al.

(10) Patent No.: US 9,398,291 B2
(45) Date of Patent: Jul. 19, 2016

(54) AUTOSTEREOSCOPIC SCREEN AND METHOD FOR REPRODUCING A 3D IMAGE

(75) Inventors: René de la Barré, Mittweida (DE); Silvio Jurk, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 110 days.

(21) Appl. No.: 14/390,759

(22) PCT Filed: Apr. 30, 2012

(86) PCT No.: PCT/EP2012/001920
§ 371 (c)(1),
(2), (4) Date: Feb. 19, 2015

(87) PCT Pub. No.: WO2013/149629
PCT Pub. Date: Oct. 10, 2013

(65) Prior Publication Data
US 2015/0163481 A1 Jun. 11, 2015

(30) Foreign Application Priority Data
Apr. 3, 2012 (DE) .......................... 10 2012 007 112

(51) Int. Cl.
H04N 13/04 (2006.01)
(52) U.S. Cl.
CPC ....... *H04N 13/0447* (2013.01); *H04N 13/0402* (2013.01); *H04N 13/0475* (2013.01); *H04N 2213/001* (2013.01)
(58) Field of Classification Search
CPC ....... H04N 13/0445–13/0447; H04N 13/0475; H04N 13/0402; H04N 13/0404; H04N 13/0409; H04N 13/0415; H04N 2213/001
See application file for complete search history.

(56) References Cited

U.S. PATENT DOCUMENTS 5,661,599 A * 8/1997 Borner ............... G02B 27/0093
                                                        348/E13.029
8,130,272 B2 * 3/2012 Pastoor .................. G09G 3/003
                                                              348/169

(Continued)

FOREIGN PATENT DOCUMENTS

WO        0118589 A1    3/2001
WO     2008029929 A1    3/2008
WO     2010091901 A1    8/2010

OTHER PUBLICATIONS

International Preliminary Report on Patentability issued in PCT/EP2012/001920, completed Oct. 7, 2014, 10 pages.

(Continued)

Primary Examiner — Patrick F Marinelli
(74) Attorney, Agent, or Firm — Faegre Baker Daniels LLP

(57) ABSTRACT

An autostereoscopic screen including a pixel matrix, an optical element, and a control unit. The pixel matrix having a multitude of disjoint subsets of pixels, with each of the subsets forming a family of parallel strips of pixels having a vertical or inclined to vertical course, wherein the subsets cyclically alternate in the horizontal direction. The optical element having a grating-like structure parallel to the strips, which sets a propagation direction of light emitted from the pixels, so that at a nominal distance from the screen, a number corresponding to the multitude, of viewing zones laterally offset relative to one another, are defined with each of the viewing zones assigned to one of the subsets and the light emitted from each of the subsets deflected into the viewing zone of the subset, the control unit for activating the pixel matrix in dependence on image data which defines a 3D-image.

12 Claims, 5 Drawing Sheets

(56) References Cited

U.S. PATENT DOCUMENTS

| | | | | |
|---|---|---|---|---|
| 8,358,335 B2 * | 1/2013 | de la Barre | G09G 3/003 | 345/419 |
| 8,614,738 B2 * | 12/2013 | Fukushima | G02B 27/2214 | 348/42 |
| 8,633,972 B2 * | 1/2014 | de la Barre | G06T 15/00 | 345/419 |
| 8,687,051 B2 * | 4/2014 | de la Barre | H04N 13/04 | 348/169 |
| 9,124,865 B2 * | 9/2015 | Ko | H04N 13/0022 | |
| 2001/0045951 A1 * | 11/2001 | Allen | G02B 27/2214 | 345/419 |
| 2003/0025995 A1 * | 2/2003 | Redert | H04N 13/0404 | 359/464 |
| 2005/0225502 A1 * | 10/2005 | Nam | H04N 13/0409 | 345/55 |
| 2005/0259323 A1 * | 11/2005 | Fukushima | G02B 27/2214 | 359/462 |
| 2007/0058258 A1 * | 3/2007 | Mather | G02B 27/2214 | 359/619 |
| 2008/0218856 A1 * | 9/2008 | Saishu | G02B 27/2214 | 359/464 |
| 2008/0309663 A1 * | 12/2008 | Fukushima | G02B 27/2214 | 345/419 |
| 2009/0278936 A1 * | 11/2009 | Pastoor | G09G 3/003 | 348/169 |
| 2010/0073465 A1 * | 3/2010 | Park | G02B 27/2214 | 348/51 |
| 2011/0128356 A1 * | 6/2011 | de la Barre | G09G 3/003 | 348/54 |
| 2011/0216061 A1 * | 9/2011 | de La Barre | G06T 15/00 | 345/419 |
| 2011/0216171 A1 * | 9/2011 | Barre | H04N 13/04 | 348/51 |
| 2011/0310003 A1 * | 12/2011 | de la Barre | H04N 13/0402 | 345/156 |
| 2011/0310092 A1 * | 12/2011 | de la Barre | H04N 13/0409 | 345/419 |
| 2012/0026164 A1 * | 2/2012 | De La Barre | H04N 13/0409 | 345/419 |
| 2012/0154395 A1 * | 6/2012 | de la Barre | H04N 13/0404 | 345/419 |
| 2012/0229610 A1 * | 9/2012 | Fukushima | G02B 27/2214 | 348/47 |
| 2013/0155052 A1 * | 6/2013 | Ko | H04N 13/0022 | 345/419 |
| 2014/0071253 A1 * | 3/2014 | de la Barre | H04N 13/0404 | 348/51 |
| 2014/0347454 A1 * | 11/2014 | Qin | H04N 13/0404 | 348/54 |
| 2015/0015686 A1 * | 1/2015 | de la Barre | H04N 13/0404 | 348/59 |
| 2015/0029317 A1 * | 1/2015 | Kim | G02B 27/2214 | 348/59 |
| 2015/0163481 A1 * | 6/2015 | de la Barre | H04N 13/0402 | 348/51 |
| 2015/0222885 A1 * | 8/2015 | de la Barre | G02B 26/00 | 348/59 |
| 2015/0256818 A1 * | 9/2015 | de la Barre | H04N 13/0409 | 348/51 |

OTHER PUBLICATIONS

International Search Report and Written Opinion issued in PCT/EP2012/001920, mailed Nov. 19, 2012, 12 pages.

* cited by examiner

AUTOSTEREOSCOPIC SCREEN AND METHOD FOR REPRODUCING A 3D IMAGE

CROSS-REFERENCE TO RELATED APPLICATIONS

This application is a national phase application of PCT Application No. PCT/EP2012/001920, internationally filed Apr. 30, 2012, which claims priority to German Application No. 10 2012 007 112.4, filed Apr. 3, 2012, all of which are herein incorporated by reference in their entirety.

TECHNICAL FIELD

This disclosure relates to an autostereoscopic screen for the simultaneous reproduction of several different images and to a method for the reproduction of a 3D image which can be carried out with such a screen.

BACKGROUND

A screen can include a pixel matrix, on which a multitude of at least six or at least eight disjoint subsets of pixels are defined such that each of the subsets forms a family of parallel strips of pixels with a vertical course or one which is inclined to a vertical, wherein the strips of the different subsets cyclically alternate in the horizontal direction. Moreover, such a screen can include an optical element which is arranged in front of or behind the pixel matrix and which has a grating-like structure orientated parallel to the strips and in each case sets a defined propagation direction of the light emitted or transmitted from the pixels, so that at a nominal distance in front of the screen and set by a geometry of the screen, a number of viewing zones laterally offset relative to one another, said number corresponding to the mentioned multitude, are defined such that each of the viewing zones is assigned to exactly one of the subsets and the light departing or transmitted from each of the subsets of pixels is deflected into the viewing zone assigned to this subset.

Screens of this type are so-called multi-view displays. With a correct use of these screens, in each case one of a number of stereoscopic half-images which corresponds to the mentioned plurality, is reproduced on the mentioned subsets of pixels, of which half-images in each case in a paired manner two which are reproduced on subsets with directly adjacent strips, complement one another into a stereo-image. In this manner, not only can an individual viewer, but also several viewers placed next to one another in front of the screen can in each case autostereoscopically perceive a three-dimensionally appearing image of the same scene. Moreover, a viewer in front of the screen can move in the lateral direction without losing the three-dimensional impression. Rather, he will see the same scene from a perspective changing according to his movement.

However, it is thereby disadvantageous that the viewer or each of the viewers can only see a 3D-image of adequate quality when, with his eyes, he maintains the nominal distance in front of the screen and which is set by the geometry of the screen. Otherwise, each eye of the viewers sees contributions specifically in different regions of the screen and to some extent overlapping of different half-images.

SUMMARY

Embodiments described in the disclosure include an autostereoscopic screen including a pixel matrix, an optical element, and a control unit. The pixel matrix has a multitude of disjoint subsets of pixels, with each of the subsets forming a family of parallel strips of pixels having a vertical or inclined to vertical course, wherein the subsets cyclically alternate in the horizontal direction. The optical element has a grating-like structure parallel to the strips, which sets a propagation direction of light emitted from the pixels, so that at a nominal distance from the screen, a number corresponding to the multitude, of viewing zones laterally offset relative to one another, are defined with each of the viewing zones assigned to one of the subsets and the light emitted from each of the subsets is deflected into the viewing zone of the subset, the control unit for activating the pixel matrix in dependence on image data which defines a 3D-image.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

DETAILED DESCRIPTION

In some embodiments, the present disclosure provides, an autostereoscopic screen, on which one can in each case see a three-dimensionally acting image of a reproduced scene, from different, where possible freely selectable distances, wherein it is to be possible for several viewers to simultaneously look at the screen and there each see a three-dimensionally acting image of the scene, and for a viewer to move laterally, without the three-dimensional impression becoming lost by him. In some embodiments, the present disclosure provides, a corresponding method for reproducing 3D-images on an autostereoscopic screen, which meets these demands.

Figure 1:
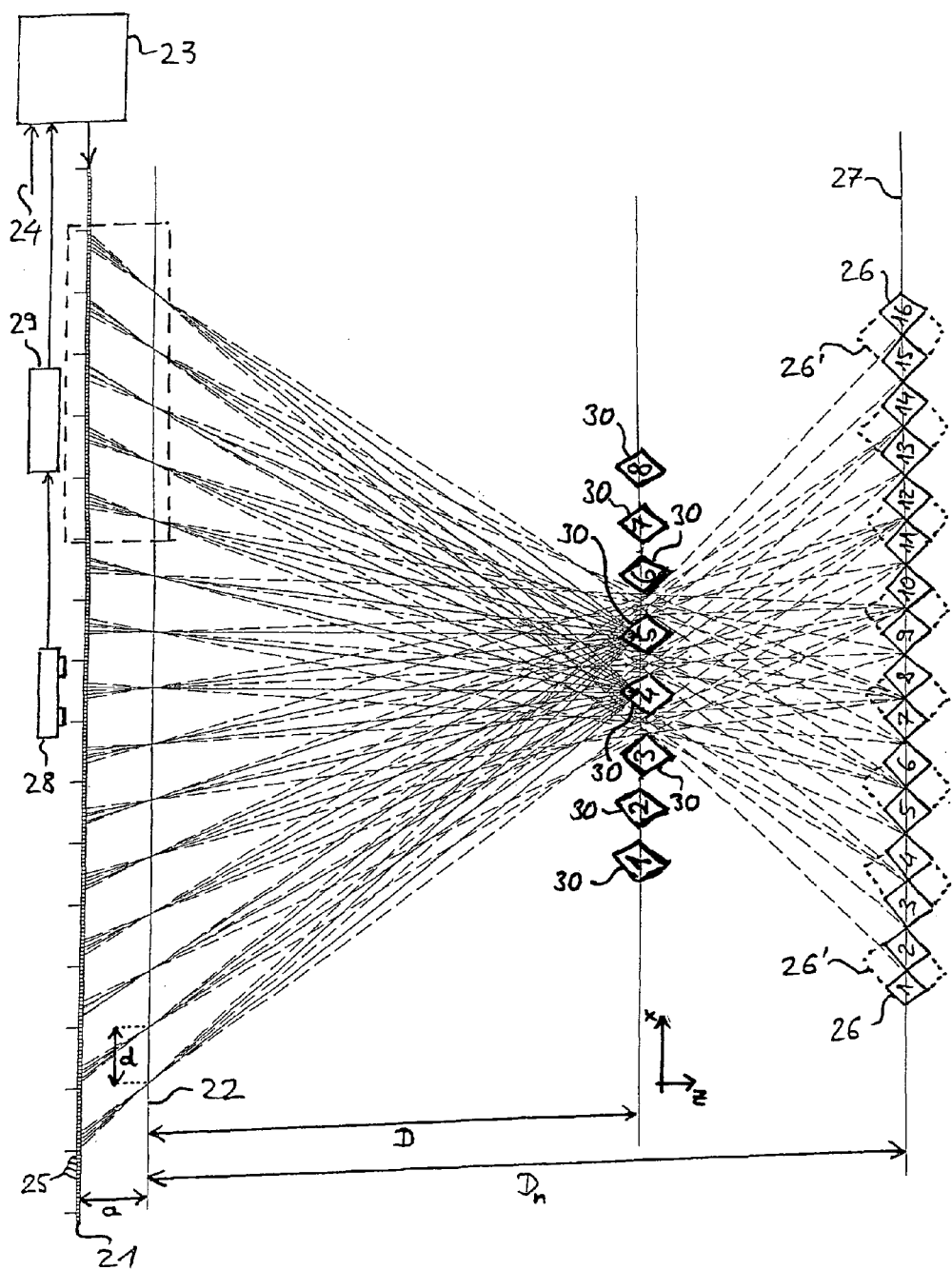
FIG. 1 is a diagram illustrating a plan view of an autostereoscopic screen and a viewing space in front of this screen, according to some embodiments described in the disclosure.

FIG. 1 is a diagram illustrating an autostereoscopic screen which is particularly suitable, as a multi-view display, to simultaneously reproduce a multitude of, in the present example up to sixteen, different images, according to some embodiments described in the disclosure. This screen comprises a pixel matrix 21 and an optical element 22 which is arranged in front of the pixel matrix 21. Moreover, the screen comprises a control unit 23 for activating the pixel matrix 21 in dependence on image data 24 which define the 3D-image. This 3D image can change temporally, so that to be more specific it is the case of an image sequence. The image data 24 can thereby be stored on a data carrier e.g. can be read out from there or be defined by a computer game, in dependence on its course.

Figure 2:
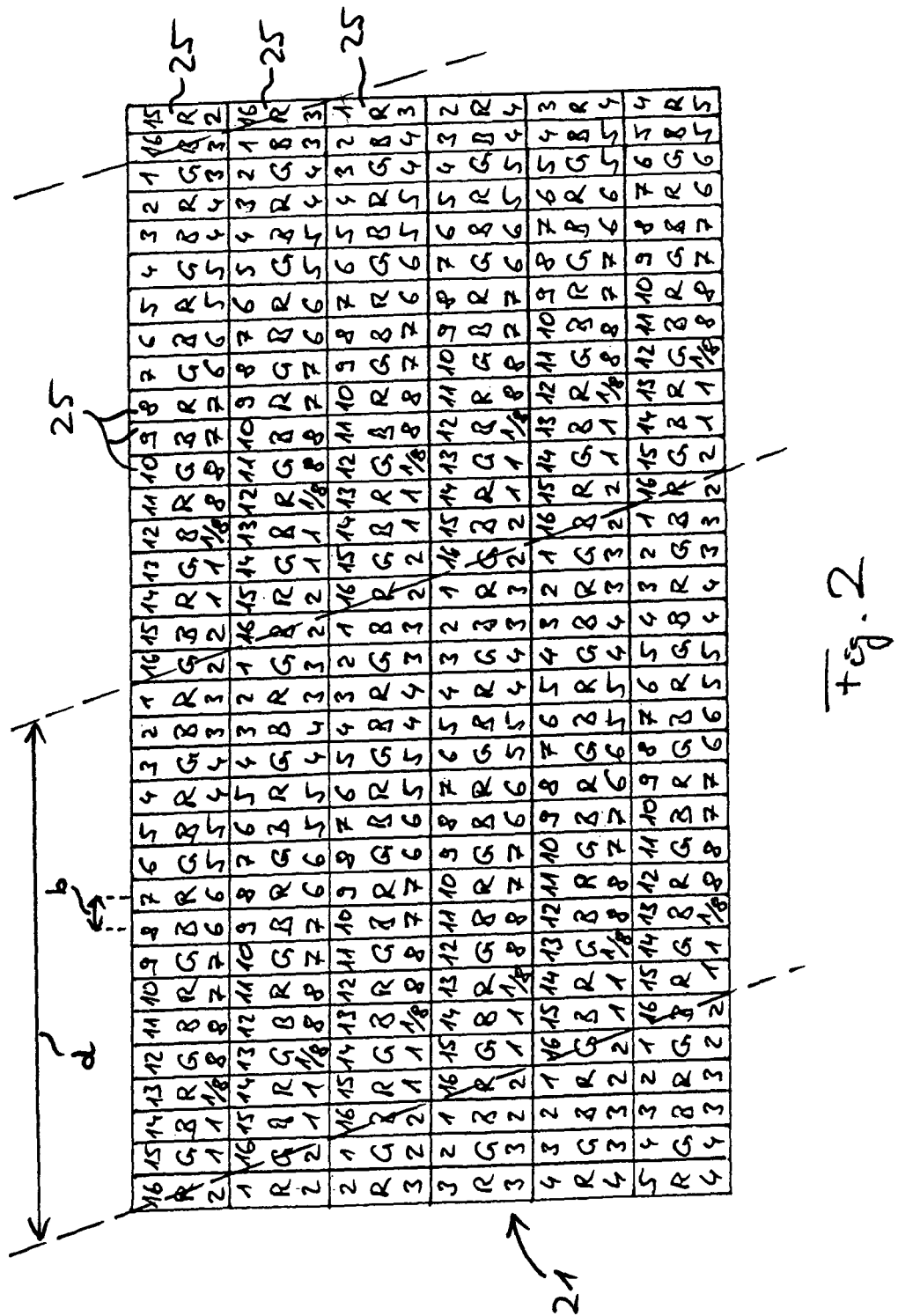
FIG. 2 is a diagram illustrating a detail of a pixel matrix of the screen of FIG. 1, in a front view, according to some embodiments described in the disclosure.

With regard to the pixel matrix 21, it is the case of a LCD or an OLED screen with a multitude of pixels 25 which are arranged in lines and columns. A detail of this pixel matrix 21 is shown in FIG. 2. There, the individual pixels 25 are represented in each case by rectangles. In the present case, with regard to the pixels 25 it is the case of subpixels of the basic colours red, green and blue—in FIG. 2 in each case characterised by the letters R, G and B.

In the present disclosure, a multitude of sixteen—the multitude can of course under certain circumstances be even significantly greater or somewhat smaller—disjoint subsets of pixels 25 are defined on the pixel matrix 21 such that each of these subsets forms a family of parallel strips. The subsets are numbered from 1 to 16 and in FIG. 2 the pixels 25 in each case in the upper region of the respective pixel are provided with the number of the subset, to which the pixel 25 belongs. As is to be recognised in FIG. 2, the mentioned strips are inclined with respect to the vertical such that three pixels 25 lying directly over one another within each of the strips each have three different basic colours and thus can complement one another into a colour-neutral image pint. Thereby, the strips of the different subsets cyclically alternate in the line direction, thus in the horizontal direction. Of course, it would also be conceivable to arrange the subpixels of different colours differently, so that the strips with the same characteristics would be vertical or inclined with respect to the vertical by another angle. The pixel matrix 21 instead of the subpixels of different basic colours could also comprise colour-neutral or multicolor pixels.

The optical element 22 can e.g. be designed as a slot grid or lenticular lens and has a grating-like structure which is orientated parallel to the strips and indicated by dashed lines in FIG. 2. Thereby $$d=16bD_n/(D_n+a),$$

for a period d of this structure in the lateral direction—corresponding to the line direction, wherein b is a lateral distance centroids of areas of adjacent pixels 25, a a distance between the pixel matrix 21 and the optical element 22 and $D_n$ a so-called nominal distance. The lateral distance b corresponds also to a lateral offset of the directly adjacent strips of pixels 25. The optical element 22 by way of this in each case sets a defined propagation direction of the light which departs or is transmitted by the pixels 25. This is effected such that at the nominal distance $D_n$ in front of the screen, a number corresponding to the previously mentioned multitude, of sixteen viewing zones 26 laterally offset to one another are defined such that each of the viewing zones 26 is assigned to exactly one of the subsets and that the light departing or transmitted from each of the subsets of pixels 25 is deflected into the viewing zone 26 assigned to this subset. Modifications, with which the optical element 22 is arranged behind the pixel matrix 21, are likewise possible. The viewing zones 26 in FIG. 1 are each represented as a rhombus and numbered from 1 to 16 according to the subset quantities. The viewing zones adjacent 26 to one another are laterally offset to one another by about 32 mm which corresponds roughly to half the average eye distance.

The sixteen part-sets of pixels 25 of the pixel matrix, as sixteen different channels of the screen can be played in with sixteen different images, which are then each visible from one of the viewing zones 26. Since the mentioned strips on the pixel matrix 21 and accordingly also the viewing zones 26 are however relatively narrow, the subsets of pixels 25 or the channels are however grouped together in pairs, with an operating mode of the screen, in which this corresponds to a conventional multi-view display. Then eight different stereoscopic half-images are reproduced on the pixel matrix 21 and specifically each on in each case two consecutive subsets of the mentioned subsets of pixels 25. Thus the subsets 1 and 2 reproduce a first, the subsets 3 and 4 a second, the subsets 5 and 6 a third, the subsets 7 and 8 a fourth, the subsets 9 and 10 a fifth, the subsets 11 and 12 a sixth, the subsets 13 and 14 a seventh and the subsets 16 and 16 an eighth stereoscopic half-image. Each of these stereoscopic half-images is then visible from one of in total eight enlarged viewing zones 26' which are numbered in FIG. 1 from 1' to 8'. The stereoscopic half-images are thereby selected such that the two stereoscopic half-image which are visible from enlarged viewing zones 26' directly adjacent one another, complement one another in each case into a stereo-image which corresponds to a view of the thus reproduced 3D-image. Then, one or more viewers can in each case see one of the three-dimensionally acting views with a depth effect, from a viewing plane 27 which lies at a nominal distance $D_n$ in front of the screen.

Here, a different operating manner of the screen is now to be described, with which the pixel matrix 21 for an autostereoscopic viewing of the 3D-image is activated from a viewing distance D which differs from the nominal distance $D_n$.

In some embodiments, in order to measure the viewing distance D, the screen includes a tracking device which here is given by a stereo-camera 28 directed onto the viewing space in front of the screen, and an evaluation device 29 for carrying out a image evaluation method. With this tracking device, a head position of at least one viewer is detected and the viewing distance D as the distance between an eye pair of this viewer and the screen is measured. The evaluation device 29 transmits the value of the viewing distance D to the control unit 23. Alternatively, the desired viewing distance D can also be inputted into the control unit 23 by way of a manual input of the user. In the present case, the viewing distance D is smaller than the nominal distance $D_n$.

The control unit 23 now by way of a suitable programming-technological device, in dependence on the image data 24 and the viewing distance D determined by the tracking device, carries out some steps which are explained in more detail hereinafter, in order to activate the pixel matrix 21 for an autostereoscopic viewing of the 3D-image from the distance D in front of the screen which differs from the nominal distance $D_n$.

Firstly, a plurality smaller compared to the mentioned multitude, of eight disjoint part-sets of pixels 25 which are different to the previously mentioned subsets, are defined on the pixel matrix and specifically in a manner such that each of these part-sets forms a family of parallel bands, wherein each of these bands is formed by way of grouping together at least two of the previously mentioned strips of pixels 25 which lie directly next to one another, and wherein the bands of the different part-sets cyclically alternate in the horizontal direction. Thereby, the mentioned part-sets and bands are defined such that a number corresponding to the mentioned plurality, of regions 30 offset relative to one another, thus eight regions 30 in the present case, are defined at the mentioned viewing distance D in front of the screen such that exactly one of the part-sets is assigned to each of these regions 30 and that the light departing or transmitted from each of the part-sets of pixels 25 is deflected by the optical element 22 into the region 30 assigned to this part-set.

The part-sets here are numbered from 1 to 8, and in FIG. 2 the pixels are each provided with the number of the part-set to which the pixel 25 belongs, in the lower region of the respective pixel. The course of the mentioned bands in FIG. 2 thus as with the course of the strips which form it, is to be recognised by way of the two numberings represented in the pixels 25. In FIG. 1 in turn, the regions 30 are represented as a rhombus in each case according to their horizontal cross-sectional shape and are numbered according to the part-sets 1 to 8, thus are provided in each case with the number of the part-set, to which the respective region 30 is assigned in the context explained above. Beam paths which depart from the pixels 25 of these part-sets and lead into the respective regions 30, are drawn by way of example for the part-sets 4 and 5. Thereby, the beams which depart from lateral edges of these pixels 25 are represented as dashed lines, and beams which fall centrally into the respective region 30 are drawn in as unbroken lines. The relations are represented in FIG. 3 enlarged once again, for a detail which is drawn in FIG. 1 as a dashed rectangle. As also in the other figures, recurring features here are provided with the same reference numerals.

Figure 3:
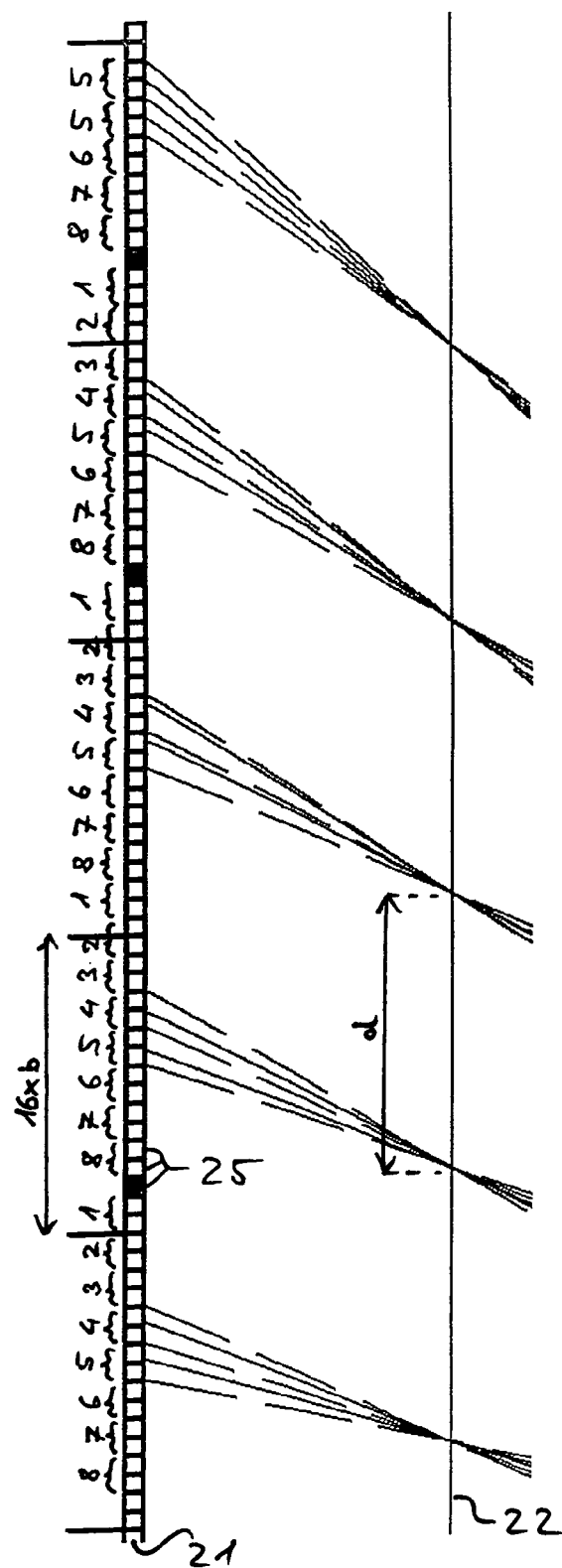
FIG. 3 is a diagram illustrating a detail from FIG. 1, in an enlarged representation, according to some embodiments described in the disclosure.

An important factual detail is to be recognised in FIG. 3. The mentioned part-sets and the bands of pixels which are formed in each case of at least two strips of pixels 25 and form these part-sets, are specifically defined such that a line running in the longitudinal direction through the respective band and being defined in that the light departing from this line falls exactly centrally into one of the regions 30, lies in each of the bands next to the middle of this band by not more than half the mentioned lateral offset b. In FIG. 3 too, the pixels 25 are additionally provided with the number of the part-set, to which they belong. The dashed lines there lead to the edges of the bands belonging to the part-sets with the numbers 4 and 5, and the beams shown as unbroken lines end on the previously mentioned lines within these bands, which are defined such that light departing from these lines falls exactly centrally into one of the regions 30. The mentioned factual detail, according to which these lines lie next to the middle of the respective band by no more than half the lateral offset b of adjacent strips, thus in FIG. 3 is to be recognised at the lines which represent the beam paths for the part-sets 4 and 5. Some pixels 25 which in FIG. 3 are held black and in FIG. 2 are provided with the reference ⅛ in each case in the lower region, can selectively either be assigned to none of the part-sets or to the part-set 1 or the part-set 8. The bands thus in each case have a width of at least 2b, wherein b again indicates the lateral distance of centroids of area of adjacent pixels 25 and corresponds to the lateral offset of the directly adjacent strips of pixels 25. It is possible that, depending on the value of the viewing distance D and of the geometry of the screen, some of the bands have a width of 3b. Thus, it is not necessary that the width of the respective band is the same for all bands. As is to be recognised in the FIGS. 2 and 3, the average lateral distance between the directly adjacent bands which form the mentioned part-sets, is somewhat larger than 2b which results from the simple geometric relations and the fact that the viewing distance D is, in the present case, smaller than the nominal distance $D_n$. Thereby, the relation given by the geometric characteristics of the screen is given by $$8b'/(D+a)=d/D$$

where b' is the average lateral distance between the directly adjacent bands which form the mentioned part-sets.

The control unit 23 now activates the pixel matrix 21 such that a number corresponding to the mentioned plurality, in the present case eight stereoscopic half-images which are defined by the image data 24 and complement one another in pairs into a stereo-image perceivable as a 3D image, are reproduced by the pixels 25 of the pixel matrix 21 in a manner such that in each case one of these stereoscopic half-images is reproduced on each of the part-sets which have been defined in the previously described manner. Thereby, one of many image strips of the respective half-image is reproduced on each of the mentioned bands of pixels 25. By way of this, a viewer who with his eyes is located within a field spanned by the regions 30 at a viewing distance D in front of the screen can see a stereo-image which represents the mentioned 3D image. The same can also apply for several viewers who are simultaneously there at a distance from one another which is not too great.

Additionally to the distance between the eye pair of the viewer and the screen, a lateral position of the eye pair can also be determined with the tracking device. Then the pixel matrix 21 can be activated by the control unit 23 additionally in dependence on the lateral position determined by the tracking device, and specifically such that the thus detected eye pair also remains within the field which is spanned by the regions 30 and from which the stereo-image is autostereoscopically visible, when the viewer laterally moves with relatively wide limits. The regions 30 for this can be laterally displaced with respect to their position shown in FIG. 1, by way of the bands of pixels 25 which form the mentioned part-sets being shifted in the same direction on the pixel matrix 21 and the part-sets being redefined by way of this.

In some embodiments, the optical element 22 can be controllable and form lens elements with refraction characteristic changeable depending on an activation of the optical element 22. The control unit 23 for this can be configured to moreover also activate the optical element 22 depending on the viewing distance D and to adapt refraction characteristics of the lens elements to this viewing distance D.

Figure 4:
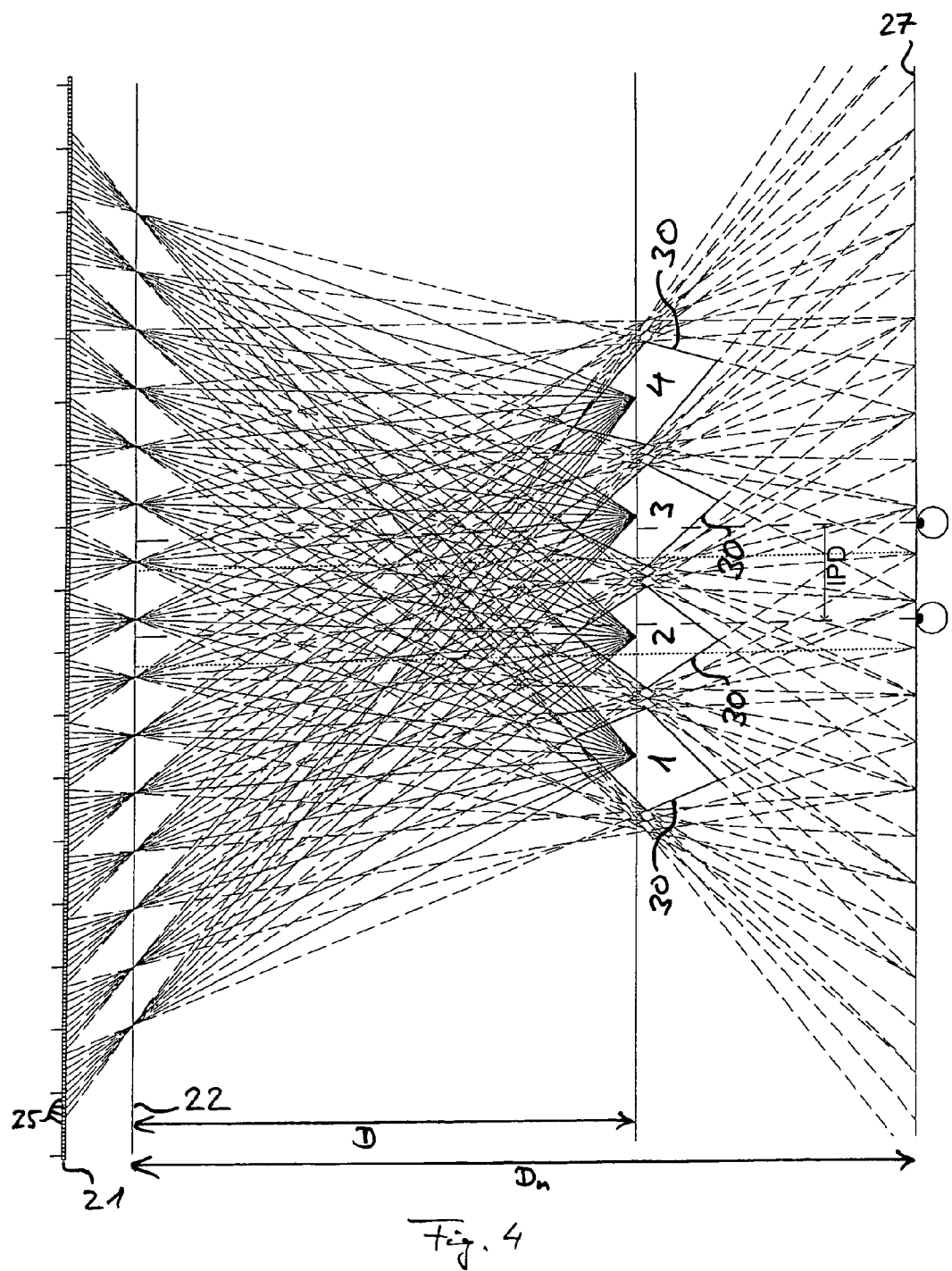
FIG. 4 is a diagram illustrating, in a representation corresponding to FIG. 1, the same screen, wherein some components of the screen are omitted and only a few beam paths are drawn by way of example, in order to explain an alternative activation of the screen, according to some embodiments described in the disclosure.
Figure 5:
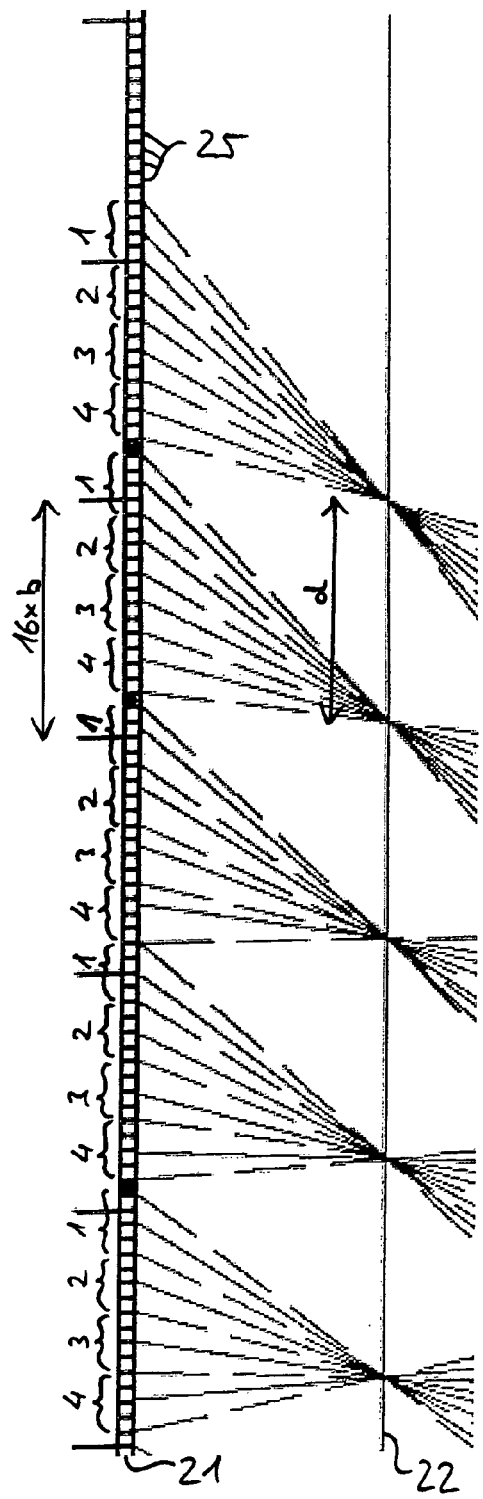
FIG. 5 is a diagram illustrating a detail of FIG. 4 in an enlarged representation, according to some embodiments described in the disclosure.

An alternative activation of the pixel matrix 21 is illustrated in the FIGS. 4 and 5, wherein recurring features are again provided with the same reference numerals and wherein FIG. 5 in an enlarged manner shows a detail of FIG. 4 which is drawn in FIG. 4 by way of a dashed rectangle. Here, only four part-sets of pixels 25 are defined on the pixel matrix 21 and now in each case are formed from four on in a few individual cases five of the mentioned strips of pixels 25. Accordingly, here only four paired complementary stereoscopic half-images are reproduced on the pixel matrix 21, and specifically again on each of the part-sets of one of the half-images. Otherwise, that which has been said above accordingly applies for the definition of the part-sets and the reproduction of the stereoscopic half-images on these part-sets. By way of this, one achieves a greater lateral offset of the regions 30 which accordingly also turn out larger. This can be advantageous with a decreasing viewing distance D, in order to ensure that two eyes of a viewer looking onto the screen from this viewing distance are located in two regions 30 which are adjacent one another. In order to illustrate this, an eye pair with the average eye distance indicated there as IPD, is also drawn in FIG. 4—but at the nominal distance $D_n$ in front of the screen. As can be recognised there, the regions 30 at the viewing distance D in front of the screen are laterally offset with respect to the directly adjacent regions 30, quite accurately by the average eye distance corresponding to about 65 mm.

In some embodiments, the viewing distance D is always smaller than the nominal distance $D_n$. The image information of the reproduced stereoscopic half-images is written into the pixel matrix 21 in a spread manner for the adaption to this reduced viewing distance D. The viewing distance D can also just as well be larger than the nominal distance $D_n$. Basically thereby one proceeds in the same manner as that previously described. Image information of the reproduced stereoscopic half-images is then written into the pixel matrix 21 in a correspondingly compressed manner for the adaptation to such an enlarged viewing distance D. This is particularly possible of, as in the case of FIGS. 4 and 5, the individual channels of the screen or the strips of pixels 25 on the pixel matrix 21 or the viewing zones 26 are so narrow, that an adequately high number of in each case at least two strips can be grouped together for forming the mentioned bands. In this case however, it can occur that one or more of the mentioned part-sets or one or more additional part-sets of pixels 25 which are otherwise defined in the same manner and are used for reproducing individual stereoscopic half-images, also contain narrower bands which are formed from only one of the mentioned strips of pixels 25.

In some embodiments, the viewing distance D is constant for all regions 30. This means that the distance between the centre of the respective region 30 and the screen is the same for all regions 30. It should be noted that this is not necessarily the case. Instead, the viewing distance D could be defined as a function assuming different values for different lateral positions in front of the screen. Thus, if x is a variable or parameter defining the lateral position in front of the screen as indicated by the coordinate system shown in FIG. 1, the viewing distance D(x) could be a non-constant function of x. The bands of the different part-sets of pixels 25 are shifted with respect to their positions shown in FIG. 1 such that, for each of the regions 30, the distance between the respective region 30 and the screen corresponds to the value $D(x_i)$ with $x_i$ being the lateral position of the centre of this region 30.

As described in the disclosure, with the screen, a lateral offset between the directly adjacent strips in each case is so small, that the mentioned viewing zones in the nominal distance in front of the screen are laterally offset with respect to the directly adjacent viewing zones in each case by less than an average eye distance. Moreover, this screen comprises a control unit for activating the pixel matrix in dependence on image data which define a 3D-image. This, for activating the pixel matrix for an autostereoscopic viewing of the 3D-image from a viewing distance in front of the screen, said distance being different to the nominal distance, is configured to carry out the following steps:

defining a plurality, smaller compared to the mentioned multitude, of at least three or at least four disjoint part-sets of the pixels of the pixel matrix, which are different to the mentioned subsets, in a manner such that each of the part-sets forms a family of parallel bands, wherein each of these bands or each of the majority of the bands or each of at least some of the bands is formed by way of grouping together at least two of the mentioned strips of pixels which lie directly next to one another, and wherein the bands of the different part-sets cyclically alternate in the horizontal direction, and reproducing a number of stereoscopic half-images, corresponding to the mentioned plurality, and which are defined by the image data and complement one another in pairs into a stereo-image perceivable as a 3D-image, by way of the pixels of the pixel matrix, in a manner such that in each case one of the stereoscopic half-images is reproduced on each of the thus defined part-sets.

Thereby, the control unit is configured to define the mentioned part-sets and bands such that at the mentioned viewing distance in front of the screen, a number of regions, corresponding to the mentioned plurality, which are laterally offset to one another, are defined such that each of these regions is assigned to exactly one of the part-sets and that the light departing or transmitted from each of the part-sets of pixels is deflected by the optical element into the region assigned to this part-set, wherein a line which runs through the respective band in the longitudinal direction and which is defined in that the light departing from this line falls exactly centrally into one of the regions, lies in each of these bands next to the middle of this band by no more than half the mentioned lateral offset.

On account of the described measures, one succeeds in an observer who views the correspondingly activated screen from the mentioned viewing distance, seeing a three-dimensionally acting image of a good image quality even if the viewing distance differs from the nominal distance. In particular, by way of the described activation of the pixel matrix, one succeeds in the viewer, at least to a very good approximation, seeing two stereoscopic half-images which are complementary to one another and complement one another into a stereo-image, despite the viewing distance not actually matching the geometry of the screen, wherein one simultaneously avoids evident and annoying irregularities or jumps resulting with a lateral movement. The screen can thus be used for very different viewing distances. An adaptation of the screen itself to the viewing distance which under certain circumstances is determined by a certain application—e.g. placing in a room of a given size and shape—is thereby not necessary.

The initially mentioned subsets of pixels of the screen can be seen as different channels of the screen for the case, in which the screen is operated as a normal multi-view display for viewing at the nominal distance. These channels and the associated viewing zones here are so narrow, that it is thereby possible to group together two or also more channels for the reproduction of a single one of different stereoscopic half-images. This is particularly the case if the mentioned viewing zones at the nominal distance in front of the screen are laterally offset with respect to the directly adjacent viewing zones in each case at the most by half the average eye distance. By way of this results the possibility of adapting the screen to other viewing distances in the described manner, since the bands of pixels which are grouped together from several strips and on which in each case image strips of one of the half-images are reproduced, can be laterally shifted in each case by the width of a strip, thus by less than a width of the complete band of pixels, by way of redistribution of the pixels between the mentioned part-sets. An adaptation to other viewing distances is thus possible by way of a simple redefinition of the mentioned part-sets by way of redistributing the mentioned strips of pixels between the different part-sets or between the bands of pixels which form these part-sets.

With a given geometry of the screen, the above mentioned condition as to how the part-sets and bands are to be defined with a given viewing distance can be fulfilled by way of the application of simple geometric relations which result from beam optics and trigonometry.

The term "stereoscopic half-images" in the present document in each case indicates views of a scene, of which two complement one another into a stereo-image of this scene, by way of them corresponding to views from—actual or virtual—camera positions or eye positions which are laterally offset relative to one another by an amount defining a disparity of these images—typically by roughly the average eye distance. The individual views are indicated as stereoscopic half-images even in the case of a family of more than two views which have these characteristic in pairs. Here, when talks of a large number of stereoscopic half-images which complement one another in pairs into a stereo-image, then the disparities between the different possible pairs of half-images will of course differ from one another. Usefully, the disparities thereby are selected such that of the family of half-images, in each case the half-images which are represented on two part-sets of pixels with directly adjacent bands of pixels, in each case correspond to views from two camera positions or eye positions which are laterally offset relative to one another by roughly an average eye distance—inasmuch as with regard to these two half-images it is not indeed the case of the first and last half-image, which differ from one another by a corresponding larger disparity.

With regard to the described screen, it can be the case of a simple multi-view display which is merely equipped with a special control unit or one which is programmed in a special manner, so that additionally to the nominal distance, freely selectable other viewing distances are possible, at least to within certain limits. The viewing zones in embodiments are usefully dimensioned such that their lateral distance in each case corresponds to an average eye distance—for example 65 mm—and the mentioned multitude can e.g. be sixteen or even larger. The pixel matrix can e.g. be given by a LCD or an OLED screen. With regard to the optical element it can in particular be the case of a parallax barrier or a lenticular lens. A combination of these grid types is also possible. In the case of a lenticular lens, the grating-like structure is typically formed by a family of parallel cylindrical lenses. Barrier grids, in particular slot grids can be used as parallax barriers. Finally, the optical element can also be a Fresnel structure or an LC-structure, which reproduces a slot grid or another grid type. The pixels can be multicolor pixels or subpixels of different basic colors—e.g. red, green and blue. In the latter mentioned case, typically three pixels or subpixels from three consecutive lines complement one another into a colour-neutral or colour-authentic image point.

A method for reproducing a 3D-image on an autostereoscopic screen of the described manner which achieves the set object is also described. With regard to this method, it is the case of embodiments of a screen with a pixel matrix and with an optical element arranged in front of or behind the pixel matrix, wherein a multitude of at least six or at least eight disjoint subsets of pixels are defined on the pixel matrix such that each of the subsets forms a family of parallel strips of pixels with a course which is vertical or inclined to the vertical, wherein the strips of the different subsets cyclically alternate in the horizontal direction, and wherein the optical element has a grating-like structure orientated parallel to the strips and in each case sets a defined propagation direction for light departing or transmitted from the pixels, so that at a nominal distance in front of the screen and set by a geometry of the screen and which is set by a geometry of the screen, a number corresponding to the mentioned multitude, of viewing zones laterally offset to one another are defined such that each of the viewing zones is assigned to exactly one of the subsets and that the light departing or transmitted from each of the subsets of pixels is deflected into the viewing zone assigned to this subset. A lateral offset between the directly adjacent strips, with this screen, in each case is so small, that the mentioned viewing zones at the nominal distance in front of the screen are laterally offset with respect to the directly adjacent viewing zones, in each case by less than an average eye distance.

With the method, the pixel matrix of this screen is activated in dependence on image data which define a 3D-image, for an autostereoscopic viewing of the 3D image at a viewing distance in front of the screen which differs from the nominal distance. For this, the method comprises the following steps:
defining a plurality smaller compared to the mentioned multitude, of at least three or at least four disjoint part-sets of pixels of the pixel matrix which are different to the mentioned subsets, in a manner such that each of the part-sets forms a family of parallel bands wherein each of these bands or each of the majority of the bands or each of at least some of the bands is formed by grouping together at least two of the mentioned strips of pixels which lie directly adjacent one another, and wherein the bands of the different part-sets cyclically alternate in the horizontal direction, and
reproducing a number corresponding to the mentioned plurality, of stereoscopic half-images which are defined by the image data and complement one another in pairs into a stereo-image perceivable as a 3D image, by way of the pixels of the pixel matrix, in a manner such that in each case one of the stereoscopic half-images is reproduced on each of the thus defined part-sets.

Thereby, the mentioned part-sets and bands are defined such that at the mentioned viewing distance in front of the screen, a number corresponding to the mentioned plurality, of regions laterally offset to one another are defined such that each of these regions is assigned to exactly one of the part-sets and that the light departing or transmitted from each of the part-sets of pixels is deflected by the optical element into the region assigned to this part-set, wherein a line which runs in the longitudinal direction through the respective band and which is defined in that the light departing from this line falls exactly centrally into one of the regions, lies in each of the bands next to the middle of this band by not more than half the mentioned lateral offset. This method can be carried out in its different designs and further developments in particular with a screen of the type described here.

Due to the fact that the part-sets of the pixels, on which the stereoscopic half-images are reproduced, and the bands of pixels which form these part-sets and for their part are formed in each case from at least two strips of pixels, are defined in the manner described here, a viewer can see the 3D-image in a good quality on the screen, although he is located at a viewing distance in front of this screen, which differs from the nominal distance for which the screen is actually designed.

The images, in particular the 3D-images and stereoscopic half-images which are discussed here can in each case also be moved images, thus sequences of temporally successive images or frames.

In some embodiments, the mentioned regions at the viewing distance in front of the screen, which differs from the nominal distance, are laterally offset with respect to the directly adjacent regions in each case by more than half the average eye distance. If the channels mentioned further above are not unusually narrow, as a rule this results in that in each case at least two of the mentioned strips of pixels are grouped together, in order to form the bands of pixels which are played in with the image strips of the different half-images. It is useful if the regions are laterally offset with respect to the directly adjacent regions, as precisely as possible by an average eye distance of typically about 65 mm.

One obtains satisfactory results with the described measures if the viewing distance which differs from the nominal distance is smaller than the nominal viewing distance. This together with the relatively narrow strips of pixels on the pixel matrix leads to sufficient strips of pixels being available, in order to form the mentioned bands of pixels and to these strips being able to be laterally shifted in adequately small steps of pixels, in order to realise a satisfactory image quality for a viewing at the mentioned viewing distance.

The control unit of the screen can be configured for the manual input or for the entry of a parameter which defines a distance value, wherein the control unit then is further configured to activate the pixel matrix such that the mentioned viewing distance corresponds to this distance value. The screen can then be adapted for different viewing distances depending on the input of a user or another setting for different viewing distances. Accordingly, with regard to the method, one can envisage a parameter which defines a distance value being inputted into a control unit of the screen or transferred to the control unit, wherein the pixel matrix is activated by the control unit such that the mentioned viewing distance corresponds to this distance value.

One can also envisage the screen additionally comprising a tracking device for determining a distance between an eye pair of at least one viewer and the screen, wherein the control unit is configured to activate the pixel matrix such that the mentioned viewing distance corresponds to the distance determined by the tracking device. An adaptation of the screen to a viewing distance which differs from the nominal distance and which changes under certain circumstances can then also be effected in an automatic manner. Accordingly, with a further development of the described method, a distance between and eye pair of at least one viewer and the screen is detected, wherein the pixel matrix is activated such that the viewing distance corresponds to the thus detected distance.

Additionally, under certain circumstances a lateral position of the at least one eye pair can also be detected, wherein the pixel matrix is then activated in dependence on the detected lateral position such that the at least one eye pair is located in a field which is spanned by the mentioned regions and from which the stereo-image is autostereoscopically viewable. With a lateral movement of the viewer or of one of the viewers, the activation of the screen by way of this can be adapted such that one prevents the viewer leaving the region, from which the 3D-image is visible and can be recognised as such. The tracking device for this purpose can be configured to also determine a lateral position of the at least one eye pair, wherein the control unit then is further configured to activate the pixel matrix in dependence on the lateral position determined by the tracking device, so that the at least one eye pair is located within a field which is spanned by the mentioned regions and from which the stereo-image is autostereoscopically visible.

In some embodiments of the screen, the optical element can be designed in a controllable manner and forms lens elements with refraction characteristics which can be changed depending on an activation of the optical element, wherein the control unit is configured to activate the optical element depending on the viewing distance, in order to adapt refraction characteristics of the lens elements to this viewing distance. Thus e.g. a focal width of the lens element can be reduced in size, in order to adapt the optical element to a shorter viewing distance. By way of this, crosstalk between different image channels, thus between the different reproduced half-images and which increases with a changing viewing distance, can be avoided.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

The invention claimed is:

1. An autostereoscopic screen for the simultaneous reproduction of several different images, comprising:
    a pixel matrix, on which a multitude of at least six or at least eight disjoint subsets of pixels are defined such that each of the subsets forms a family of parallel strips of pixels with a vertical course or one which is inclined to a vertical, wherein the strips of the different subsets cyclically alternate in the horizontal direction,
    an optical element which is arranged in front of or behind the pixel matrix and which has a grating-like structure orientated parallel to the strips and in each case sets a defined propagation direction of the light emitted or transmitted from the pixels, so that at a nominal distance ($D_n$) in front of the screen and which is set by a geometry of the screen, a number corresponding to the multitude, of viewing zones laterally offset relative to one another, are defined such that each of the viewing zones is assigned to exactly one of the subsets and that the light departing or transmitted from each of the subsets of pixels is deflected into the viewing zone assigned to this subset, and
    a control unit for activating the pixel matrix in dependence on image data which define a 3D-image,
    wherein a lateral offset (b) between the directly adjacent strips in each case is so small that the mentioned viewing zones at the nominal distance ($D_n$) in front of the screen are laterally offset with respect to the directly adjacent viewing zones in each case by less than an average eye distance,
    wherein the control unit, for activating the pixel matrix for an autostereoscopic viewing of the 3D-image from a viewing distance (D) in front of the screen, said distance being different to the nominal distance ($D_n$), is configured to carry out the following steps:
        defining a plurality smaller compared to the mentioned multitude, of at least three or at least four disjoint part-sets of the pixels of the pixel matrix which are different to the subsets, in a manner such that each of the part-sets forms a family of parallel bands, wherein each of these bands or each of the majority of the bands or each of at least some of the bands is formed by way of grouping together at least two of the strips of pixels which lie directly next to one another, and wherein the bands of the different part-sets cyclically alternate in the horizontal direction, and
        reproducing a number corresponding to the plurality, of stereoscopic half-images which are defined by the image data and complement one another in pairs into a stereo-image perceivable as a 3D-image, by way of the pixels of the pixel matrix, in a manner such that in each case one of the stereoscopic half-images is reproduced on each of the thus defined part-sets,
    wherein the part-sets and bands are defined such that at the viewing distance (D) in front of the screen, a number corresponding to the plurality, of regions which are laterally offset to one another, is defined such that each of these regions is assigned to exactly one of the part-sets and that the light departing or transmitted from each of the part-sets of pixels is deflected by the optical element into the region assigned to this part-set, wherein a line which runs through the respective band in the longitudinal direction and which is defined in that the light departing from this line falls exactly centrally into one of the regions, lies in each of the bands next to the middle of this band by no more than half the lateral offset (b).

2. The screen of claim 1, wherein the viewing zones at the nominal distance ($D_n$) in front of the screen are laterally offset with respect to the directly adjacent viewing zones in each case at the most by half an average eye distance.

3. The screen of claim 1, wherein the regions at the viewing distance (D) in front of the screen, are laterally offset with respect to the directly adjacent regions in each case by more than half the average eye distance.

4. The screen of claim 1, wherein the viewing distance (D) differing from the nominal distance ($D_n$) is smaller than the nominal viewing distance ($D_n$).

5. The screen of claim 1, wherein the control unit is configured for the manual input or for the entry of a parameter which defines a distance value, wherein the control unit is configured to activate the pixel matrix such that the viewing distance (D) corresponds to this distance value.

6. The screen of claim 1, comprising a tracking device for determining a distance between an eye pair of at least one viewer and the screen, wherein the control unit is configured to activate the pixel matrix such that the viewing distance (D) corresponds to the distance determined by the tracking device.

7. The screen of claim 6, wherein the tracking device is configured to determine a lateral position of the at least one eye pair, wherein the control unit is configured to activate the pixel matrix in dependence on the lateral position determined by the tracking device, so that the at least one eye pair is located in a field which is spanned by the regions and from which the stereo-image is autostereoscopically visible.

8. The screen of claim 1, wherein the optical element is controllable and forms lens elements with refraction characteristics which can be changed depending on an activation of the optical element, wherein the control unit is configured to activate the optical element depending on the viewing distance (D), in order to adapt refraction characteristics of the lens elements to this viewing distance (D).

9. A method for reproducing a 3D-image on an autostereoscopic screen with a pixel matrix and with an optical element arranged in front of or behind the pixel matrix,
wherein a multitude of at least six or at least eight disjoint subsets of pixels are defined on the pixel matrix such that each of the subsets forms a family of parallel strips of pixels with a course which is vertical or inclined with respect to the vertical, wherein the strips of the different subsets cyclically alternate in the horizontal direction,
and wherein the optical element has a grating-like structure orientated parallel to the strips and in each case sets a defined propagation direction for light departing or transmitted from the pixels, so that at a nominal distance ($D_n$) in front of the screen and set by a geometry of the screen, a number corresponding to the multitude, of viewing zones laterally offset to one another are defined such that each of the viewing zones is assigned to exactly one of the subsets and that the light departing or transmitted from each of the subsets of pixels is deflected into the viewing zone assigned to this subset,
wherein the pixel matrix is activated in dependence on image data which define a 3D-image,
wherein
a lateral offset (b) between the directly adjacent strips in each case is so small, that the mentioned viewing zones at the nominal distance ($D_n$) in front of the screen are laterally offset with respect to the directly adjacent viewing zones, in each case by less than an average eye distance,
and the pixel matrix is activated for an autostereoscopic viewing of the 3D-image from a viewing distance (D) in front of the screen, said distance being different to the nominal distance ($D_n$), wherein the method comprises the following steps:
defining a plurality smaller compared to the multitude, of at least three or at least four disjoint part-sets of the pixels of the pixel matrix, which are different to the subsets, in a manner such that each of the part-sets forms a family of parallel bands, wherein each of these bands or each of the majority of the bands or each of at least some of the bands is formed by way of grouping together at least two of the mentioned strips of pixels which lie directly next to one another, and wherein the bands of the different part-sets cyclically alternate in the horizontal direction, and
reproducing a number corresponding to the mentioned plurality, of stereoscopic half-images which are defined by the image data and complement one another in pairs into a stereo-image perceivable as a 3D image, by way of the pixels of the pixel matrix, in a manner such that in each case one of the stereoscopic half-images is reproduced on each of the thus defined part-sets,
wherein the part-sets and bands are defined such that at the mentioned viewing distance (D) in front of the screen, a number corresponding to the plurality, of regions laterally offset to one another are defined such that each of these regions is assigned to exactly one of the part-sets and that the light departing or transmitted from each of the part-sets of pixels is deflected by the optical element into the region assigned to this part-set, wherein a line which runs in the longitudinal direction through the respective band and which is defined in that the light departing from this line falls exactly centrally into one of the regions, lies in each of the bands next to the middle of this band by not more than half the lateral offset (b).

10. The method of claim 9, comprising a parameter which defines a distance value is inputted into a control unit of the screen or transferred to the control unit, wherein the pixel matrix is activated by the control unit such that the viewing distance (D) corresponds to this distance value.

11. The method of claim 9, comprising a distance between an eye pair of at least one viewer and the screen is detected, wherein the pixel matrix is activated such that the viewing distance (D) corresponds to the thus detected distance.

12. The method of claim 11, comprising a lateral position of the at least one eye pair is to be detected, wherein the pixel matrix is then activated in dependence on the detected lateral position such that the at least one eye pair is located in a field which is spanned by the regions and from which the stereo-image is autostereoscopically viewable.

* * * * *